United States Patent Office 3,639,318
Patented Feb. 1, 1972

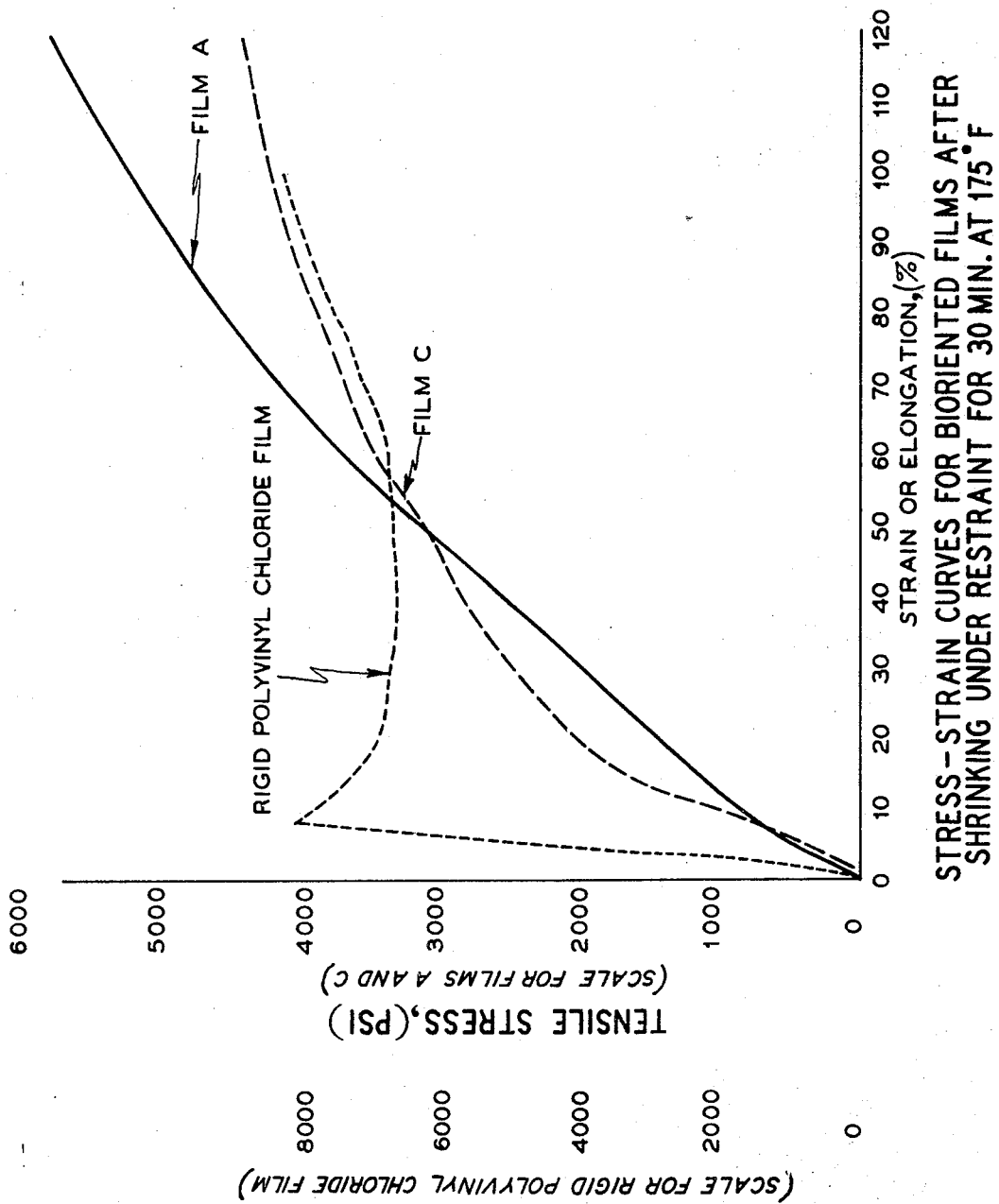

3,639,318
PLASTICIZED POLYVINYL CHLORIDE FILM
Donatas Tijunelis and Edward A. Shiner, Chicago, Ill., assignors to Union Carbide Corporation
Filed May 29, 1968, Ser. No. 733,086
Int. Cl. C08f 45/28; B65b 25/22
U.S. Cl. 260—23 XA                                     15 Claims

ABSTRACT OF THE DISCLOSURE

A highly plasticized polyvinyl chloride film is biaxially oriented to obtain a film which, after shrinking, exhibits residual elasticity and improved stress characteristics thereby providing an improved wrapping or packaging film for food items, particularly food items that are subject to frequent customer handling. The biaxially oriented plastic film obtained is utilized as a packaging film for storing food items at refrigerator or freezing temperatures, or for cooking the packaged food items at elevated temperatures, followed by storage at refrigerator or freezer temperatures.

This invention relates to biaxially oriented films which possess a high degree of elasticity after being heat shrunk. More particularly, this invention relates to a method for producing such films from highly plasticized polymers, and the use of such films as a wrapping or package for food products which can be stored therein at freezing temperatures and cooked therein at elevated temperatures.

Soft food products wrapped in clear plastic films are inevitably subjected to customer handling during the retailing of such products. In the case of meat products, for example, handling of the thusly wrapped meats is invited and often desirable since sales of the wrapped meat products are often made on the basis of the tenderness of the meat which the customer feels with his fingers through the film wrapping. Under these circumstances, an ideal wrapping film would be one which is clear and transparent as well as soft and yielding under the pressure of customers' fingers but which would return to its original tautness and appearance after being so handled. In order to attain this, a film should exhibit elastic recovery in order to maintain the tautness and neat appearance of the wrapped meat product even after repeated customer handling. A depression made in the film package or wrapping by the customer during inspection of the meat product must be capable of being corrected by the elastic recovery property inherent in the film. The only commercially available films meeting this requirement are highly plasticized polyvinyl chloride films. Other commercially available films such as shrinkable polyvinyl chloride films having a low plasticizer content, do not have this elastic recovery property. Low plasticized films are generally considered to be those having a plasticizer content of from about 15 to 20 parts per 100 parts resins. Films having a plasticizer content of less than about 10 parts per 100 parts resin are generally not considered to be plasticized while those having a plasticizer content of more than about 20 parts per 100 parts resin are considered to be highly plasticized.

In wrapping fresh red meats with plastic films, the films should also exhibit a high oxygen transmission of at least about 200 cc./mil/24 hours/100 sq. in./atm. in order to preserve the red color of the meat. Highly plasticized polyvinyl chloride films meet this requirement but shrinkable polyvinyl chloride films with lower than about 20% plasticizer content do not exhibit sufficiently high oxygen transmission rates.

Other food items which are odd-shaped, such as barbequed chicken, spare ribs, vegetables and the like have also been packaged in various plastic films in attempts to obtain packaged food items wherein the plastic film snugly conforms to and about the contours of the odd-shaped food items packaged therein. Generally, the thusly packaged food items are stored at refrigerant or freezing temperatures and are subsequently cooked at elevated temperatures while contained in these plastic film packages or the thusly packaged food items can first be cooked at elevated temperatures and then stored at refrigerant or freezing temperatures. Hence, the ability of these plastic films to withstand temperature extremes is of paramount importance. At refrigerant or freezing temperatures, the film must not become brittle and subject to breakage, particularly when handled by prospective customers. During cooking the packaged food item, such as immersing it in boiling water, the film must be capable of retaining sufficient strength so that it does not break. Preferably, the film should also exhibit a sufficient degree of elasticity so that it is capable of expanding with increased volume of the food item being cooked therein as the temperature of the food item increases and recovering as the volume of the package decreases with cooling.

Heretofore, various commercially available films have been utilized for packaging, storing and cooking these food items. For example, an elastic polyvinyl chloride film has been used as the packaging material for these food items and has been found to be generally acceptable as a "cook-in" package since it exhibits adequate elasticity for expansion during cooking and adequate recovery upon cooling the thusly cooked product. However, this film has been found to be deficient at refrigerant or freezing temperatures since it becomes brittle and subject to breakage. Other commercially available, shrinkable films, such as those obtained from polyethylene, polypropylene, polyethylene terephthalate and the like, have also been examined for these purposes but have not been found to be completely acceptable or satisfactory since they either do not exhibit sufficient shrink characteristics during water cooking (polypropylene); are not readily sealed (polyethylene terephthalate); are subject to stress cracking at the seals or elsewhere after cooking (polypropylene and polyethylene); soften and lose all strength and package integrity during cooking (ethylene vinyl acetate copolymers); or do not have sufficient elasticity to conform to the shape of the item as the packaged food item expands during and contracts after cooking.

In commercial packaging operations, it is desirable that films used as a wrapping or packaging for food items also be capable of being readily fabricated. Preferably, these films should exhibit good machine handleability. Thin, highly plasticized polyvinyl chloride films, with thicknesses of from about 0.5 to 1.0 mil, tend to be limp and are, therefore, difficult to handle on bag making or packaging machinery. Monodirectionally shrinkable, plasticized polyvinyl chloride films having a high plasticizer content, generally meet some of the aforementioned requirements but have a tendency to form wrinkles in the direction of orientation after shrinkage which detracts from package appearance. Monodirectionally oriented films also do not exhibit good low temperature durability.

It is an object of this invention, therefore, to provide a plastic film which exhibits a high degree of elasticity after being heat shrunk, a high oxygen transmission rate, has excellent machine handleability to facilitate its use in automated wrapping or packaging operations of food items, shrinks in two directions to avoid wrinkling, and which can withstand freezing and/or cooking temperatures without loss of package integrity at these temperature extremes.

This and further objects of the invention will become more apparent from the ensuing description thereof.

It has now been found that the objects of the invention can be generally obtained by biaxially orienting a thick walled, highly plasticized, polyvinyl chloride film to obtain therefrom a thin walled film which exhibits high clarity, high oxygen transmission rates, a high degree of shrinkage, rigidity before shrinking, good elastic recovery after shrinking, and durability at both freezing and cooking temperatures.

The types of films that can be utilized in the invention are those which are obtainable from the extrusion of such resins as polyvinyl chloride homopolymers and polyvinyl chloride copolymers having an inherent viscosity of from about 0.8 to 1.4, and which have been highly plasticized. The copolymers of vinyl chloride which can be utilized are polymerizable monomers such as those selected from the class consisting of vinylidene chloride, vinyl acetate, acrylonitrile and the like. The resin formulations from which the films of the invention are obtained can have typically incorporated therein the usual amount of stabilizers, surfactants, lubricants and other additives.

The amount of plasticizer generally incorporated in these resins in order to render them plasticized can range from about 25 to 50 parts per hundred parts resin and the resulting films obtained therefrom are generally referred to in the art as being "plasticized." As used throughout this application and in the appended claims, therefore, it should be understood that the term "plasticized" is intended to refer to and should be understood as referring to those plasticized films obtained from resins having a plasticizer incorporated therein as has been generally described immediately hereinabove.

A typical, plasticized, polyvinyl chloride resin formulation which can be utilized in the invention is set forth in Table I below wherein the concentration of each component is expressed in parts per hundred parts resin and a generally acceptable range of each component which can be employed is compared with a generally preferred range of each component.

TABLE I.—RESIN FORMULATION

| Component | Concentration (parts per/100) | |
| --- | --- | --- |
| | General range | Preferred range |
| Resin—polyvinyl chloride homopolymer (inherent viscosity 0.8–1.4) | 100 | 100 |
| Plasticizers—(di-(2-ethylhexyladipate) and epoxidized soybean oil) | 25–50 | 28–38 |
| Stabilizers—organo-metallic type (Ca-Zn) | 1–4 | 2–3 |
| Lubricants—(stearic acid and/or N,N di-stearyl ethylene diamine) | 0–2 | 0.5 |

As indicated in Table I above, a minimum total plasticizer level of about 25 parts should be used to obtain satisfactory film elasticity after shrinkage. Although it is preferred to use a plasticizer level up to about 38 parts, as shown in Table I above, it has been found possible to extrude resin formulations containing up to about 50 parts total plasticizer. The upper limit of plasticizer capable of being incorporated in the resin formulation will be determined primarily by the ability to extrude the resultant soft resin formulation as well as freedom from creep that the subsequently extruded film exhibits after orientation. It has been further found that the resin formulation should preferably contain from about 5 to 10 parts of epoxidized soybean oil as one of the plasticizer components in conjunction with any other plasticizer, such as is exemplified in Table I above.

Incorporation of stabilizers, lubricants and other additives, such as colorants and surfactants, while desirable, are not mandatory in order to obtain the film properties desired in the invention. As is known to those skilled in the art, these components can be added to a resin formulation to the extent that the subsequently extruded film exhibits and possesses those characteristics and properties desired or required to be obtained.

Tubular films can be obtained from the exemplary resin formulations listed in Table I above by utilizing extrusion methods and apparatus well known to those skilled in the art. Hence, any conventional dry blending and extrusion technique can be readily employed to obtain the tubular films of the invention. Once the tubular, extruded film is obtained, it is subjected to biaxial orientation by the commonly referred to "double bubble" method. Conventional apparatus known to and used by those skilled in the art can be employed to biaxially orient the extruded tubular films of the invention.

Biorientation is affected by drawing a thick walled primary film in two directions perpendicular to each other while the film is at a temperature at which application of stress causes plastic deformation but below that temperature at which it melts, becomes fluid, or deforms without any stress application. The biorientation of tubular, plasticized polyvinyl chloride film by the "double bubble" process is accomplished at a temperature above room temperature and below the extrusion temperature of the particular film formulation. The extruded, thick walled, primary tubing, after being heated to the desired temperature, is inflated under pressure to produce a transverse direction stretching and simultaneously stretched in the machine direction between two sets of squeeze rolls driven at a speed differential. The inflated, thick walled tubing captured between the two sets of differentially driven squeeze rolls while being heated, undergoes dimensional change in the machine and transverse directions at the point at which sufficient heat has been absorbed by the thick walled tubing to undergo plastic deformation. At this point, the bubble expands in diameter, increases in length and the film becomes thinner.

During orientation, it has been found important to control the stretching of the film in the machine and transverse directions and to control the temperature at which the film is drawn. The stretching of the film can be expressed numerically in terms of the draw ratio. The draw ratio can be computed from the formula $$(F.W._p/F.W._s)^2 \times (Thickness_p/Thickness_s)$$

wherein the term "F.W." refers to the flat width of the tubular film, the term "Thickness" refers to the wall thickness of the tubular film, the subscript "$p$" refers to the primary bubble of the tubular film and the subscript "$s$" refers to the secondary bubble of the tubular film.

The draw ratio and the point at which the secondary bubble is bioriented can be regulated and controlled by, in turn, regulating and controlling the speed at which the film travels, the differential in speed of the secondary bubble before and after biorientation, the amount of air admitted into the secondary bubble, and the heat output of the heating units used to elevate the temperature of the film. It has been found that the lower the temperature of the film at the point where it is biaxially oriented, the higher the degree of orientation that can be induced in the film.

The invention will become more clear when considered together with the following examples which are set forth as being illustrative and exemplary and are not intended, in any way, to be limitative thereof. Unless otherwise stated, all parts and percentages are by weight.

EXAMPLE I

Two plasticized, polyvinyl chloride films exhibiting different properties were obtained from the extrusion of polyvinyl chloride homopolymer resins. The resin formulations and the conditions under which each film was extruded are set forth in Table II below wherein the resin formulations are listed under the films designated as "Film A" and "Film B," and the term "Tween 80" identifies the trade name of a commercially available surfactant.

TABLE II.—RESIN FORMULATION AND EXTRUSION CONDITIONS

|  | Film A | Film B |
|---|---|---|
| Resin formulation (parts per 100): | | |
| Polyvinyl chloride homopolymer (inherent viscosity 0.8–1.4) | 100 | 100 |
| Plasticizers: | | |
| Di(2-ethylhexyl)adipate | 29 | 29 |
| Epoxidized soybean oil | 5 | 5 |
| Stabilizer: organo metallic type (Ca–Zn) | 2.05 | 2.08 |
| Lubricant: stearic acid | 0.6 | 0.6 |
| Surfactant: Tween 80 | | 3.0 |
| Extrusion Conditions: | | |
| Dry blend temperature (° C.) | 130 | 128 |
| Dry blend time (minutes) | 120 | 180 |
| Dry blend density (lbs./cu. ft.) | 3.8 | |
| Blender | (1) | (1) |
| Flat width—primary tube (in.) | 6.5 | 6.5 |
| Thickness—primary tube (mils) | 6.0 | 6.0 |
| Die opening (mils) | 17–20 | 21 |
| Die diameter (in.) | 2.5 | 2.5 |
| Average die temperature (° F.) | 380 | |
| Average barrel temperature (° F.) | 330 | 320 |
| Throughput (lbs./hr.) | 35–40 | 41–43 |

1 Sigma blade.

Films A and B, identified in Table II above, were then biaxially oriented and the degree of orientation induced in the films at different heat inputs and draw ratios for each of the films was determined. These results are set forth in Table III below wherein the percent of film shrinkage for each of the films after biorientation was determined at 90° C. in both the machine direction and transverse direction denoted by the letters "MD" and "TD," respectively, the film speed of both the bioriented film and the primary bubble is set forth in feet per minute and the maximum temperature of the heating units employed indicates the temperature recorded before each film was drawn upwardly through the heaters, the temperatures being recorded at the center of the uppermost heater.

Permanent deformation

Permanent deformation is defined as the percent increase in a length of a sample of film after it has been stretched 50% and thereafter allowed to relax.

To obtain these values, three film samples cut in the machine direction and measuring 1″ x 5″, and three film samples cut in the transverse direction and measuring 1″ x 5″, were tested in an Instron Tensile Tester having a sensitive load cell capacity of 50 pounds maximum. The thickness of each film sample was measured and recorded. The settings of the Instron Tensile Tester were calibrated to use a 1 pound weight. The "A" cross-head speed was set at 2″ per minute while the "B" cross-head speed was set at 20″ per minute and the jaw separation was set at 2″. The film sample was inserted between the jaws in the long direction with the chart scale of the tester set in its most sensitive position in order to insure a minimum of slackness or tightness in the sample. The chart scale was then turned to its proper position for testing. The distance traveled on the chart for the "B" speed stretching being measured in inches was recorded and the distance traveled on the chart in inches for the "A" speed until the first indication of stress return was noted. The calculations for permanent deformation for each sample thus treated were determined according to the following equation:

Percent deformation
$$= \left(\frac{\text{Recorded Chart Distance at ``A'' Speed}}{\text{Length of Original Sample}}\right) \cdot \left(\frac{\text{``A'' Cross-Head Speed}}{\text{Recorded Chart Speed}}\right) \cdot (100)$$

TABLE III.—BIORIENTATION CONDITIONS

| Film | Percent of film shrinkage at 90° C. | | Film speed (f.p.m.) | | Primary bubble size | | Bioriented film dimensions | | Draw ratio | Maximum temp. of heating units, ° F. |
|---|---|---|---|---|---|---|---|---|---|---|
| | MD | TD | Prior to drawing | After drawing | Flat width (inches) | Wall thickness (mils) | Flat width (inches) | Wall thickness (mils) | | |
| A | 41 | 42 | 5 | 14 | 6½ | 6 | 18½ | 0.8 | 0.93 | 250 |
| B | 20 | 18 | 5 | 13½ | 6½ | 6 | 18½ | 0.7 | 1.08 | 310 |

As can be seen from the results set forth in Table III above, the degree of orientation is dependent upon temperature conditions and the ratios of flat widths and thicknesses of the bioriented films to those of the primary tubes. For example, it has been found that by adjusting the temperatures and stretching of the tubing as it is subjected to biaxial orientation, primary tubing having flat widths of from about 3.0″ to 8.0″ and thicknesses of from about 3.0 to 12.0 mils can be employed and there can be obtained therefrom biaxially oriented films having thicknesses of from about 0.5 to 2.0 mils and flat widths of from about 8.0″ to 20″. Hence, by controlling and adjusting the temperature of the film as it is being biaxially oriented and the draw ratio of the film, the flat widths and thicknesses of biaxially oriented films can be controlled and regulated to provide the types of films desired or required.

The properties of the plasticized, bioriented polyvinyl chloride films identified in Table II above were determined and the results obtained therefrom are set forth in Table IV below. In Table IV the values shown for tensile strength, elongation and stress properties at 10% were derived from the data gathered after film samples were subjected to ASTM D-638-58T. The values for permanent deformation, stress return, shrinkage and shrink force were determined according to the following methods and procedures.

Stress return

The purpose of this test was to measure the tendency of a film sample at a given elongation to recover its initial stress after it had been subjected to further stretching and then allowed to return. The degree of stretch recovery of the films tested was determined by the following equation:

Stress Return
$$= \frac{\text{Load at 25\% elongation after 50\% stretch and relaxation}}{(\text{Film Thickness}) \cdot (\text{Film Width})}$$

The same type of Instron Tensile Tester and the same number and types of samples were utilized in this test as were utilized to determine permanent deformation as set forth hereinabove. The Instron Tensile Tester was set at the same readings for this test as they were to determine permanent deformation except that the "A" cross-head speed was set for 50″ per minute and the chart speed was set at 20″ per minute. The sample was then inserted in the testing apparatus in the long direction and the load measured at 50% stretch, the initial load at 25% stretch, and the final equilibrium load at 25% stretch.

The stress return ratio of the film samples was then determined according to the following equation:

$$\text{Stress Return Ratio} = \frac{\text{Final load at } 25\%}{\text{Initial Load at } 25\%}$$

Percent shrinkage

The values for percent shrinkage of the oriented film samples were determined by immersing a sample measuring about 1¼" x 1 centimeter in a water bath maintained at a predetermined temperature for a period of 5 seconds and then measuring the change in the longitudinal dimension of the film samples.

Shrink force

The shrink force of a film is that force or stress required to prevent shrinkage of the film and was determined from film samples taken from each film. Three film samples were cut 1" wide by 7" long in the machine direction and 1" wide by 7" long in the transverse direction. The average thickness of the film samples was determined and recorded and a strip chart recorder was calibrated at 0 gram and at 1,000 grams full scale load. Each film sample was then secured to a strain gauge transducer. The thusly secured film sample and strain gauge transducer were then immersed in a bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the result is obtained in grams per mil of film thickness (g./mil):

$$\text{Shrink Force (g./mil)} = \frac{F}{T}$$

wherein F is the force in grams and T is the average thickness of the film samples in mils.

As indicated hereinabove the results of these determinations are set forth in Table IV below wherein the property of film samples after being shrunk at 100° C. are also listed.

TABLE IV.—HEAT SHRINK AND ELASTIC PROPERTIES OF BIORIENTED FILM

|  | Film A | | Film B | |
| --- | --- | --- | --- | --- |
|  | MD | TD | MD | TD |
| Tensile Strength (p.s.i.) | 8,900 | 12,700 | 8,500 | 6,900 |
| Elongation at break (percent) | 156 | 101 | 95 | 96 |
| Stress at 10% elongation (p.s.i.) | 1,800 | 2,200 | 1,900 | 1,350 |
| Permanent deformation (p.s.i.) | 7 | 7.5 | 5 | 6 |
| Stress return (p.s.i.) | 450 | 370 | 310 | 270 |
| Stress return ratio | 0.10 | 0.11 | 0.12 | 0.14 |
| Percent Shrinkage at: | | | | |
| 80° C | 34 | 34 | 15 | 15 |
| 90° C | 41 | 42 | 20 | 18 |
| 100° C | 47 | 47 | 20 | 25 |
| Shrink force at 90° C. (g./mil) | 117 | 93 | 49 | 35 |
| Shrink force at room temperature after shrinkage at 90° C. (g./mil) | 89 | 70 | 38 | 29 |
| Properties After Shrinkage at 100° C. | | | | |
| Permanent deformation (Percent) | 5.5 | 4.5 | 4 | 3.5 |
| Stress return (p.s.i.) | 170 | 180 | 180 | 182 |
| Stress return ratio | 0.20 | 0.20 | 0.23 | 0.0 |

The data set forth in Table IV above reveals the typical heat shrink and elastic properties of bioriented, plasticized polyvinyl chloride films obtained from resin formulations which preferably render these films useful as a wrapping or packaging material for fresh food products.

EXAMPLE II

In order to further demonstrate the unique elastic properties of the bioriented, plasticized polyvinyl chloride films of the invention, a test was devised wherein the film samples were subjected to conditions essentially simulating those conditions to which a film would be subjected during its use as an overwrap or package material for food products.

Film samples were mounted on a metal frame measuring 5½" x 3¼" and then shrunk thereon for a period of 30 seconds in a hot air oven maintained at a temperature of 100° C. The permanent deformation at 75% stretch for each of the film samples was determined while the films were still on the frames and in a taut position resulting from the shrinkage of the film during heating. Permanent deformation of the film samples was determined in the same manner as set forth hereinabove for Table IV.

This test simulated the deformation of a film in place on a food product when subjected to handling. The measurement of permanent deformation of the films after being stretched under actual packaging tension becomes a direct measurement of the stresses and strains to which the film would be subjected under actual handling conditions and the appearance that would result from the finger depressions created thereon by customer handling of the package film in retail outlets.

The results obtained from these tests are set forth in Table V below wherein the film samples identified as films "A" and "B" are the same as those set forth in Table II above while the film sample identified as "Film C" is a bioriented polyethylene film produced from a high molecular weight resin having a melt index of about 0.2 gm./10 min., a density of 0.918 gm./cc., and shrinkage equivalent to Film B.

TABLE V.—PERMANENT DEFORMATION AFTER 75% STRETCH

| | Time after 75% stretch (seconds) | Percent permanent deformation | |
| --- | --- | --- | --- |
| | | MD | TD |
| Film sample: | | | |
| A | 30 | 6.0 | 7.5 |
| | 180 | 0.0 | 0.5 |
| B | 30 | 6.0 | 6.5 |
| | 180 | 0.5 | 0.5 |
| C | 30 | 8.5 | 21.0 |
| | 180 | 5.5 | 18.5 |

As can be seen from the results set forth in Table V above, both of the bioriented polyvinyl chloride film samples (Films A and B) exhibited far less permanent deformation than did the bioriented polyethylene film sample (Film C) clearly indicating the elastic character of the plasticized, bioriented polyvinyl chloride films, especially after shrinkage.

In gathering the data for Table V above, it was also observed that when Films A and B were mounted on the metal frames to be heat shrunk, they surprisingly exhibited a low temperature shrinkage characteristic; that is, these films began to exhibit shrinkage when exposed to a temperature of about 60° C. for a period of only about 5 seconds. When the temperature was raised to about 70° C., about 50% of the potential shrinkage in the film was activated. These results indicate that these films can be heat shrunk about a food item at a faster rate and at lower temperatures than has been heretofore attained, an important factor in automatic heat-shrink packaging operations.

In order to further demonstrate the difference between the properties of the bioriented, polyvinyl chloride films of the invention and other oriented films, Film A (identified in Table II above) was compared with Film C (identified in Example II above) and a rigid, bioriented, commercially available polyvinyl chloride film with a plasticizer content of less than 10% and having the following properties:

Tensile strength:
  M.D. 7,000 to 8,000 p.s.i.
  T.D. 7,000 to 8,000 p.s.i.
Elongation:
  M.D. 50 to 60%
  T.D. 10%
Gas permeability:
  Oxygen, 22 cc./mil/24 hrs./100 sq. in./atm.

The elastic properties of these films were determined both before and after they were subjected to shrinkage conditions. Each of the films were shrunk under restraint for 30 minutes at a temperature of 175° F. and then permitted to return to room temperature. From these tests, it was found that after shrinkage, the bioriented polyvinyl chloride film of the invention maintained a relatively constant proportionality of stress to strain; that is, it exhibited a constant modulus of elasticity. By contrast, the rigid, bioriented polyvinyl chloride film sample exhibited a brittle behavior while the oriented polyethylene film sample exhibited some elastic behavior but a noticeable elastic or proportional limit; that is, a point of permanent deformation at relatively low levels of elongation. The results of these tests are graphically illustrated in the sole figure of the attached drawing.

EXAMPLE III

In order to evaluate and compare the behavior and characteristics of films at freezing temperatures, six plasticized polyvinyl chloride films were fabricated from the resin formulations set forth in Table VI below wherein the films obtained are identified as films "D," "E," "F," "G," "H," and "I." All resin formulations were compounded and extruded into tubular films in the same manner as set forth hereinabove for films A and B. Films D, F and H were not biaxially oriented while films E, G and I were each biaxially oriented in the same manner as were films A and B above.

TABLE VI.—RESIN FORMULATIONS

| Resin formulation (parts per 100) | Film | | | | | |
|---|---|---|---|---|---|---|
| | D | E | F | G | H | I |
| Polyvinyl chloride homopolymer (inherent viscosity 0.8-1.4) | 100 | 100 | 100 | 100 | 100 | 100 |
| Plasticizers: | | | | | | |
| Di(2-ethylhexyl)adipate | 30 | 28 | 30 | 28 | 28 | 28 |
| Epoxidized soybean oil | 7 | 5 | 7 | 5 | | |
| Epoxidized fatty glyceride | | | | | 10 | 10 |
| Stabilizer: organo metallic type (Ca-Zn) | 2.5 | 2.5 | 5.0 | 2.5 | 3.75 | 3.75 |
| Lubricant: stearic acid | 0.2 | 0.2 | 0.2 | 0.2 | 0.75 | 0.75 |
| Surfactant: Tween 80 | 4.0 | 4.0 | 4.0 | 4.0 | | |

The physical properties of the films set forth in Table VI above were also determined utilizing the same tests and procedures as set forth hereinabove in connection with films A and B. The results obtained are set forth in Table VII below.

from are set forth in Table VIII below. Impact strength values for the films listed in Table VIII were obtained from a modified version of the impact test described and disclosed in Modern Packaging, November 1951, by D. W. Flierl. Essentially, this test measures the loss in kinetic energy of a steel ball of a known mass falling between two fixed points from a known height through a single thickness of a film sample of known dimensions positioned between the fixed points. The kinetic energy loss is then computed from the equation:

$$KE = \frac{m}{2}\left[\left(\frac{D}{t} - \frac{gt}{2}\right)^2 - \left(\frac{D}{t_1} - \frac{gt_1}{2}\right)^2\right]$$

where $m$ is the mass of the steel ball in pounds, $D$ is the distance in feet between the two fixed points, $g$ is the force of gravity expressed as 32 feet per (second)$^2$, $t$ is the time elapsed in seconds of the unimpeded fall of the ball between the two fixed points, and $t_1$ is the time elapsed in seconds of the fall of the ball between the two fixed points impeded by the single thickness of film. The kinetic energy values are obtained in foot-pounds but can be converted to inch-pounds by multiplying the result by the factor 0.375.

TABLE VIII.—IMPACT STRENGTH CHARACTERISTICS AT −10° F.

| | Film | | | | | |
|---|---|---|---|---|---|---|
| | D | E | F | G | H | I |
| Inch-pounds per mil | 6 | 28 | 8 | 22 | 28 | 39 |

As can be seen from the results set forth in Table VIII above, the bioriented films (E, G, and I) performed better in each instance at low temperature than did the non-biaxially oriented films (D, F and H).

EXAMPLE IV

In order to evaluate and compare the films of the invention as "cook-in" packages, films E (plasticized, bioriented polyvinyl chloride film) and H (plasticized, unoriented polyvinyl chloride film) from Example III above were fabricated into packages by utilizing conventional heat-sealing apparatus and methods. The packages obtained from these films were then compared with packages fabricated from a slot cast low density polyethylene film having a density of 0.92 and a melt index of less than 1.0 and a blown film obtained from an ethylene vinyl acetate copolymer having a vinyl acetate content of about 3.5% and a melt index of less than 1.0. The packages thusly fabricated had the dimensions set forth in Table IX below wherein the slot cast polyethylene film is identified as Film J and the ethylene vinyl acetate copolymer film is identified as Film K.

TABLE VII.—ELASTIC AND SHRINK PROPERTIES OF FILMS

| | D | | E | | F | | G | | H | | I | |
|---|---|---|---|---|---|---|---|---|---|---|---|---|
| | MD | TD | MD | TD | MD | TD | MD | TD | MD | TD | MD | TD |
| Tensile strength (p.s.i.) | 3,700 | 3,100 | 10,500 | 10,400 | 4,540 | 4,160 | 16,300 | 4,000 | 4,600 | 3,000 | 6,660 | 9,000 |
| Stress at 40% elongation (p.s.i.) | 1,500 | 1,200 | 9,400 | 6,100 | 1,460 | 1,150 | (¹) | 2,030 | 1,400 | 1,200 | 3,790 | 5,940 |
| Percent elongation at break | 230 | 250 | 50 | 75 | 390 | 490 | 30 | 160 | 280 | 330 | 110 | 85 |
| Percent shrinkage at 90° C | | | 34 | 36 | | | 58 | 25 | | | 23 | 37 |
| Thickness (mils) | 0.8 | | 0.55 | | 1.3 | | 1.3 | | 1.6 | | 1.25 | |

¹ Not measurable at 40% elongation.

In comparing the stress at 40% elongation of the biaxially oriented film I with the non-biaxially oriented film H, both of which were obtained from the same resin formulation, the increase in stiffness, which is a measure of machine handleability of the biaxially oriented film, is apparent.

The performance of these films at freezing temperatures was then determined and the results obtained there-

TABLE IX

| Film | Package dimensions | | |
|---|---|---|---|
| | Thickness (mils) | Length (inches) | Width (inches) |
| E | 0.75 | 14 | 7.0 |
| H | 1.5 | 14 | 5.0 |
| J | 2.0 | 14 | 6.5 |
| K | 2.0 | 14 | 6.5 |

Into the film packages identified in Table IX above, there was placed a two pound frying chicken which had been dusted with a commercially obtained barbecue seasoning. Substantially all the air was evacuated from each package so that the films would closely adhere to the contours of the chickens. The open end of each package was then closed by use of a conventional clip closure apparatus.

A portion of the thusly packaged chickens were then cooked in water maintained at a temperature of from about 165° F. to 180° F. for a period of about 2 hours and 45 minutes. Another portion of the thusly packaged chickens were cooked in an oven maintained at a temperature of about 225° F. for a period of about 2 hours until the internal temperature of the chickens was about 165° F. All of the thusly cooked and packaged chickens were chilled overnight for a period of about 12 hours at a temperature of about 40° F. The packaged chickens cooked in water were, after being chilled, frozen for 3 days at a temperature of about −10° F.

During cooking of the packaged chickens in water, the packages fabricated from films J and K become soft resulting in the formation of many holes in the films. On the other hand, the packages fabricated from films E and H had no failures.

During oven cooking, the packages fabricated from films J and K failed completely by breaking up and fragmenting whereas the packages fabricated from films E and H exhibited no failures of any kind.

After being chilled at 40° F., the packages fabricated from film E exhibited excellent film appearance in clarity, tautness and adherence to the contours of the chickens. The packages fabricated from film H also exhibited good conformation of film to the contours of the chicken.

After freezing, the packaged chickens were impact tested manually. No failure were observed in the packages fabricated from film E while those packages fabricated from film H shattered at their points of impact.

From the results and observations set forth hereinabove, it can be seen that packages fabricated from the films of the invention (E) exhibit those desirable properties of clarity, tautness, adherence to irregularly shaped food items packaged therein, as well as toughness and durability at extreme temperatures which set them significantly apart from and superior to other films heretofore utilized for these purposes.

EXAMPLE V

The maximum shrinkage and shrink force obtainable from a bioriented, plasticized polyvinyl chloride film is, within limits, inversely related to the extent or degree of plasticization. The elasticity of the film before and after shrinkage is directly related to the degree of plasticization. Furthermore, the required oxygen and moisture vapor transmission rates are also directly related to the degree of plasticization. Consequently, when specifically formulating a film for a fresh meat packaging application requiring a high degree of elasticity to withstand retail handling and high oxygen transmission rates for proper meat color, a higher degree of plasticization is employed. On the other hand, when formulating a film for a cooking and freezing application, a lower degree of plasticization can be used since maximum shrink force and shrinkage is desired to produce a tight package during cooking and minimum moisture vapor transmission is desired to resist dehydration during the storage of the product at freezing temperatures. A certain minimum amount of plasticization, however, is still needed to produce the desired elastic shrink characteristics during cooking and obtain film toughness at cold temperatures.

These findings are exemplified in Tables X and XI below wherein Table X lists resin formulations from which a film for use in packaging fresh foods and a film for use as a temperature resistant packaging material are identified therein as film W and P, respectively, and Table XI lists the physical properties of these films.

TABLE X

| Resin formulation (parts per 100) | Film W | Film P |
|---|---|---|
| Resin—Polyvinyl chloride homopolymer (inherent viscosity 0.8–1.4) | 100 | 100 |
| Plasticizers: | | |
| Dibutyl sebacate | 28 | |
| Di(2-ethylhexyl) adipate | | 21 |
| Epoxidized soybean oil | 7 | 8 |
| Stabilizer: organo metallic type (Ca-Zn) | 2.5 | 3.75 |
| Lubricant: stearic acid | 0.5 | 0.75 |
| Surfactant: Tween 80 | 3.0 | |
| Slip agent: diatomaceous earth | | 0.3 |
| Pigment: Burnt sienna | | 0.05 |

The resin formulations set forth in Table X above were then extruded into films. The films, W and P, obtained therefrom were biaxially oriented in the same manner as described hereinabove for films A and B in Example I and Tables II and III. The physical properties of these films, W and P, were obtained in the same manner as described and set forth hereinabove in Examples I and II and these results are set forth in Table XI below wherein the values were obtained while the films were not under tension in order to provide comparative data on a common basis.

TABLE XI.—PHYSICAL PROPERTIES OF FILMS W AND P

| | Film W | | Film P | |
|---|---|---|---|---|
| | MD | TD | MD | TD |
| Thickness (mils) | 0.8 | | 1.8 | |
| Tensile stress at 40% elongation (p.s.i.) | 5,290 | 2,140 | 7,610 | 4,080 |
| Stress return (p.s.i.) | 333 | 141 | 400 | 267 |
| Permanent deformation (percent) | 4 | 9 | 13 | 14 |
| Elongation at break (percent) | 66 | 125 | 92 | 149 |
| Elongation at break after complete shrinkage (percent) | 243 | 174 | 260 | 258 |
| Percent shrinkage at: | | | | |
| 70° C | 20 | 9 | 39 | 32 |
| 80° C | | | 47 | 39 |
| 90° C | 31 | 22 | 50 | 41 |
| Shrink force at 90° C. (g./mil) | 68 | 28 | 155 | 73 |
| Shrink force after shrinkage at 90° C. (g./mil) | 54 | 25 | 126 | 60 |
| Impact strength at −10° F. (in.-lb./mil) | 50 | | 36 | |

As can be seen from the results set forth in Table XI above, each of the films exhibit those properties which are desirable for use as a packaging film for fresh food products (Film W) or as a film for use as a packaging material for cook-in package applications (Film P).

In addition to the properties listed in Table XI above for films W and P, these films were also tested for other properties which are desirable to be exhibited by these films for their respectively intended end uses. The oxygen transmission at room temperature for film W, after shrinking, was found to be from about 400 to 500 cc./mil/24 hrs./100 sq. inches/atmosphere while that of film P was found to be from about 180 to 200 cc./mil/24 hrs./100 sq. inches/atmosphere at room temperature. Similarly, the moisture vapor transmission at room temperature for film W, after shrinking, was found to be about 24 gms./mil/24 hrs./100 sq. inches/atmosphere while that of film P was found to be about 11 gms./mil/24 hrs./100 sq. inches/atmosphere. Red meat packaging tests with these and other films with various oxygen transmissions have shown that the duration of retention of red color of the meat packaged in films with oxygen transmissions of at least 200 cc./mil/24 hrs./100 sq. inches is several days. The loss in meat color becomes more rapid using films with lower oxygen transmission rates. Red meat packaged in the rigid polyvinyl chloride film of Example II with an oxygen transmission of 20 cc./mil/24 hrs./100 sq. inches loses its red color in several hours after packaging.

It should be understood that the plasticizers utilized and set forth herein have been merely by way of illustration. Other plasticizers well known to those skilled in the art can also be employed in lieu of or in combination with the illustrated plasticizers. Exemplary of other plasticizers which can be used are the so-called "primary plasticizers" which include but are not limited to di-phenyl-2-ethylhexyl phosphate, di-(2-ethylhexyl)azelate, di-butyl sebacate, di-octyl phthalate, tricresyl phosphate, di-(2-ethylhexyl)phthalate, triphenyl phosphate and the like. Similarly, the so-called "secondary plasticizers" which can be used include the glycidyl ester of an epoxidized fatty acid, butyl phthalyl butyl glycolate and the like.

Hence, although the present invention has been described in some detail and with particularity, it should be understood that changes, modifications and alterations can be made therein without departing from the scope and spirit of the invention.

What is claimed is:

1. A biaxially oriented, highly plasticized, polyvinyl chloride film having a plasticizer content of from about 25 to about 38 parts per one hundred parts resin, said film being made from resins selected from the class consisting of a polyvinyl chloride homopolymer having an inherent viscosity of from about 0.8 to 1.4, said plasticizer consisting of a monomeric ester primary plasticizer component and from about 5 to 10 parts per hundred parts of resin of an epoxidized fatty acid ester secondary plasticizer component, said film being characterized in that it exhibits a shrinkage of from about 18% to 60% at 90° C., and a permanent deformation no greater than about 15% upon being stretched up to about 75% after shrinkage.

2. The film of claim 1 wherein the plasticizer content is from about 28 to 38 parts per 100 parts resin and said film exhibits a minimum shrink force at 90° C. of about 45 g./mil in the machine direction and about 30 g./mil in the transverse direction.

3. The film of claim 1 wherein said film exhibits a shrinkage value at 70° C. which is at least 50% of the maximum shrinkage exhibited at 90° C.

4. The film of claim 1 wherein said film exhibits a minimum oxygen transmission rate of about 200 cc./mil/ 24 hrs./100 sq. inches/atmosphere.

5. The film of claim 1 wherein said monomeric ester primary plasticizer component is selected from the group consisting of phthalate diesters, adipate diesters, sebacate diesters, azelate diesters, phosphate triesters and mixtures thereof.

6. The film of claim 5 wherein said secondary plasticizer component consists of from about 5 to 10 parts epoxidized soybean oil.

7. A plastic film package for packaging a food item therein, said plastic film package being fabricated from a biaxially oriented highly plasticized, polyvinyl chloride film having a plasticizer content of from about 25 to about 38 parts per 100 parts resin, said film being made from resins selected from the class consisting of a polyvinyl chloride homopolymer having an inherent viscosity of from about 0.8 to 1.4, said plasticizer consisting of a monomeric ester primary plasticizer component and from about 5 to 10 parts per hundred parts of resin of an epoxidized fatty acid ester secondary plasticizer component, said plastic film being characterized in that it exhibits a shrinkage of 90° C. of from about 18% to 60% and a permanent deformation no greater than about 15% upon being stretched up to about 75% after shrinkage.

8. The plastic film package of claim 7 wherein the plasticizer content of said plastic film is from about 28 to 38 parts per 100 parts resin and said film exhibits a minimum shrink force at 90° C. of about 45 g./mil in the machine direction and about 30 g./mil in the transverse direction.

9. The plastic film package of claim 7 wherein said monomeric ester primary plasticizer component is selected from the group consisting of phthalate diesters, adipate diesters, sebacate diesters, azelate diesters, phosphate triesters and mixtures thereof.

10. The plastic film package of claim 9 wherein said secondary plasticizer component consists of from about 5 to 10 parts epoxidized soybean oil.

11. The plastic film package of claim 7 wherein said package can be subjected to temperatures of from about −10° F. to 225° F. and maintain package integrity.

12. The plastic film package of claim 7 wherein said plastic film exhibits a minimum oxygen transmission rate of about 200 cc./mil/24 hrs./100 sq. inches/atmosphere.

13. A plastic film package for packaging a food item therein, said plastic film package being fabricated from a biaxially oriented highly plasticized, polyvinyl chloride film containing from about 28 to 38 parts of a plasticizer per hundred parts resin, said polyvinyl chloride being selected from the class consisting of a polyvinyl chloride homopolymer having an inherent viscosity of from about 0.8 to 1.4, said plasticizer consisting of a monomeric ester primary plasticizer component and from about 5 to 10 parts per hundred parts of resin of an epoxidized fatty acid ester secondary plasticizer component, said film exhibiting a minimum shrink force at 90° C. of about 45 g./mil in the machine direction and about 30 g./mil in the transverse direction and said plastic film package being characterized in that it can be subjected to temperatures of from about −10° F. to 225° F. and maintain package integrity.

14. The plastic film package of claim 13 wherein one component of said plasticizer consists of from about 5 to 10 parts epoxidized soybean oil.

15. The plastic film package of claim 13 wherein said plastic film exhibits a minimum oxygen transmission rate of about 200 cc./mil/24 hrs./100 sq. inches/atmosphere.

References Cited
UNITED STATES PATENTS

| | | | |
|---|---|---|---|
| 2,559,177 | 7/1951 | Terry et al. | 260—30.4 |
| 2,857,349 | 10/1958 | Greenspan et al. | 260—23 |
| 3,261,793 | 7/1966 | Stevenson | 260—23.7 |
| 3,406,136 | 10/1968 | Scarso et al. | 260—23.7 |
| 3,479,308 | 11/1969 | Gattenby et al. | 260—23 |

DONALD E. CZAJA, Primary Examiner

H. S. COCKERAM, Assistant Examiner

U.S. Cl. X.R.

99—171; 260—30.6, 31.2, 32.6, 45.75